(12) United States Patent
Genma et al.

(10) Patent No.: US 7,248,014 B2
(45) Date of Patent: Jul. 24, 2007

(54) MOTOR CONTROL SYSTEM

(75) Inventors: Eiji Genma, Yamanashi (JP); Yasusuke Iwashita, Yamanashi (JP); Hiroyuki Kawamura, Yamanashi (JP)

(73) Assignee: Fanuc Ltd, Yamanashi (JP)

( * ) Notice: Subject to any disclaimer, the term of this patent is extended or adjusted under 35 U.S.C. 154(b) by 0 days.

(21) Appl. No.: 10/461,331

(22) Filed: Jun. 16, 2003

(65) Prior Publication Data

US 2004/0000890 A1    Jan. 1, 2004

(30) Foreign Application Priority Data

Jun. 28, 2002    (JP)    ............................. 2002-189148

(51) Int. Cl.
*G05B 1/00*    (2006.01)

(52) U.S. Cl. ................. 318/638; 318/560; 318/568.22; 318/629; 318/632; 700/245; 700/246; 700/247; 700/248; 700/264

(58) Field of Classification Search ................ 318/638, 318/611, 568.18, 609, 610, 560, 630, 452, 318/629, 561; 700/245–264
See application file for complete search history.

(56) References Cited

U.S. PATENT DOCUMENTS

| | | | | |
|---|---|---|---|---|
| 4,378,592 A | * | 3/1983 | Heiberger et al. | 700/206 |
| 4,841,208 A | * | 6/1989 | Itoh | 318/561 |
| 5,371,450 A | * | 12/1994 | Hiraoka | 318/560 |
| 5,475,291 A | * | 12/1995 | Yoshida et al. | 318/568.22 |
| 5,508,596 A | * | 4/1996 | Olsen | 318/569 |
| 5,684,375 A | * | 11/1997 | Chaffee et al. | 318/638 |
| 5,714,831 A | * | 2/1998 | Walker et al. | 310/316.01 |
| 6,184,644 B1 | * | 2/2001 | Eguchi | 318/632 |
| 6,198,246 B1 | * | 3/2001 | Yutkowitz | 318/561 |
| 6,233,497 B1 | * | 5/2001 | Kachi et al. | 700/173 |
| 6,507,165 B2 | * | 1/2003 | Kato et al. | 318/611 |
| 6,534,944 B2 | * | 3/2003 | Toyozawa et al. | 318/625 |
| 6,590,358 B1 | * | 7/2003 | Tsutsui | 318/560 |
| 6,736,018 B2 | * | 5/2004 | Terada | 73/862.27 |

(Continued)

FOREIGN PATENT DOCUMENTS

JP    55-97621    7/1980

(Continued)

*Primary Examiner*—Rita Leykin
(74) *Attorney, Agent, or Firm*—Staas & Halsey LLP (57) ABSTRACT

A motor control system capable of securing stability and rapidity of motion even in a machine where the stability varies in accordance with a position of a driven member. The driven member and a motor for driving the driven member are operatively connected through a transmission mechanism including a nonlinear element such that a rate of change of the position of the driven member with respect to the position of the motor varies in dependence on the position of the motor. Optimum values of multiplier factors of operation constants with respect to the position of the driven member or the rotational position of the motor for the position control and the velocity control are stored in a data table. The values of the multiplier factors of the operation constants for a present position of the driven member or a present position of the motor are determined using the data table and the determined values of the multiplier factors are multiplied by reference operation constants to update the operation constants. The position and/or velocity control processing is performed using the updated optimum operation constants in accordance with the present position of the driven member or the present rotational position of the motor.

23 Claims, 4 Drawing Sheets

U.S. PATENT DOCUMENTS 6,961,628 B2 * 11/2005 Yutkowitz .................... 700/37

FOREIGN PATENT DOCUMENTS

| JP | 62-190501 |   | 8/1987 |
| --- | --- | --- | --- |
| JP | 62-203203 | * | 9/1987 |
| JP | 63-274395 |   | 11/1988 |
| JP | 1-106120 |   | 4/1989 |
| JP | 2-59910 |   | 2/1990 |
| JP | 3-288215 |   | 12/1991 |
| JP | 4-85604 |   | 3/1992 |
| JP | 4-38310 |   | 9/1992 |
| JP | 7-175405 |   | 7/1995 |
| JP | 7-261773 |   | 10/1995 |
| JP | 8-161004 |   | 6/1996 |
| JP | 08-161004 | * | 6/1996 |
| JP | 8-286758 |   | 11/1996 |
| JP | 2000-263299 |   | 9/2000 |
| JP | 2001-92531 |   | 4/2001 |
| JP | 2001-242908 |   | 9/2001 |
| JP | 2001-300799 |   | 10/2001 |

* cited by examiner

MOTOR CONTROL SYSTEM

BACKGROUND OF THE INVENTION

1. Field of the Invention

The present invention relates to a motor control system for controlling a servomotor for driving an axis of a driving mechanism of an industrial machine such as a robot, a machine tool, an injection molding machine and a press machine.

2. Description of Related Art

In an industrial machine such as a robot, a machine tool, an injection molding machine and a press machine, a driving axis for driving a driven member is driven by a servomotor such that a position and/or a velocity of the driving axis is feedback controlled by position control processing and velocity control processing. Conventionally, operation constants, such as gains, for use in mathematical operations in the position control processing and the velocity control processing have been set to fixed values. The position control processing and/or the velocity control processing is performed using the fixed operation constants even in a control system where stability of the system varies in dependence on a position of the driving axis (a position of the driven member and a rotational position of the servomotor).

For example, in a machine in which a nonlinear element is intervened between the servomotor and the driven member in a transmission mechanism for mechanically connecting the servomotor and the driven member such that relation of a rotational position of the servomotor with respect to a position of the driven member is not proportional, a ratio between the position feedback and the velocity feedback changes in dependence of the position of the driving axis. Since this is equivalent to an effect that a reduction ratio of the transmission mechanism dynamically changes in accordance with the position of the driven member, the control system becomes stable at a position of a relatively large reduction ratio and unstable at a position of a relatively small reduction ratio. Thus, in the conventional motor control system, the operation constants have been predetermined in view of the stability of the system at the position where the dynamic reduction ratio of the transmission mechanism is relatively small. As a result, the operation at the position where the dynamic reduction ratio is relative large to be made slow to delay the whole cycle time of motion of the machine.

SUMMARY OF THE INVENTION

An object of the present invention is to provide a motor control system capable of securing stability of control and rapidness of operation even in the case where the stability of the control system varies in dependence with the position of the drive axis.

The present invention provides a motor control system for controlling a servomotor for driving a driven member through a transmission mechanism for mechanically connecting the servomotor and the driven member. The motor control system comprises: a servo controller having a position control section for performing position control processing for feedback controlling a position of the driven member, and a velocity control section for performing velocity control processing for feedback controlling a velocity of the driven member; and operation constant varying means for varying operation constants for the position control processing to be performed by the position control section and/or the velocity control processing to be performed by the velocity control section in accordance with a present position of the driven member. The operation constant varying means may vary the operation constants in accordance with a present rotational position of the servomotor mechanically connected with the driven member by the transmission mechanism.

The motor controller may comprise a host controller for commanding the servo controller. The present position of the driven member may be determined based on a position command issued from the host controller or a position feedback signal from a detector for detecting a position of the driven member. The present rotational position of the servomotor is determined based on a position command issued from the host controller or a position feedback signal from a detector for detecting a rotational position of the servomotor.

The operation constant varying means may comprise storage means for storing data representing relation between the position of the driven member or the rotational position of the servomotor and the operation constants, and determines values of the operation constants for the present position of the driven member or the present rotational position of the servomotor using the stored data.

Alternatively, the operation constant varying means may comprise storage means for storing an mathematical equation representing relation between the position of the driven member or the rotational position of the servomotor and the operation constants, and determines values of the operation constants for the present position of the driven member or the present rotational position of the servomotor using the stored mathematical equation. The storage means storing the data or the mathematical equation may be provided in the host controller.

The operation constant varying means may start varying of the operation constants upon receipt of a signal from an external device or a signal produced by internal processing in the motor control system or a program command.

The operation constant varying means may determine values of the operation constants to be varied smoothly.

The operation constants for the position control section and/or the velocity control section may be set to upper limit values until an initial position of the driven member is established after a power supply to the motor control system is turned on.

The driven member may be a mold of an electric press machine for performing a press work. In this case, the operation constants have different values at a position where the press work is performed and at a position where the press work is not performed.

DETAILED DESCRIPTION OF THE PREFERRED EMBODIMENTS

Figure 1A:
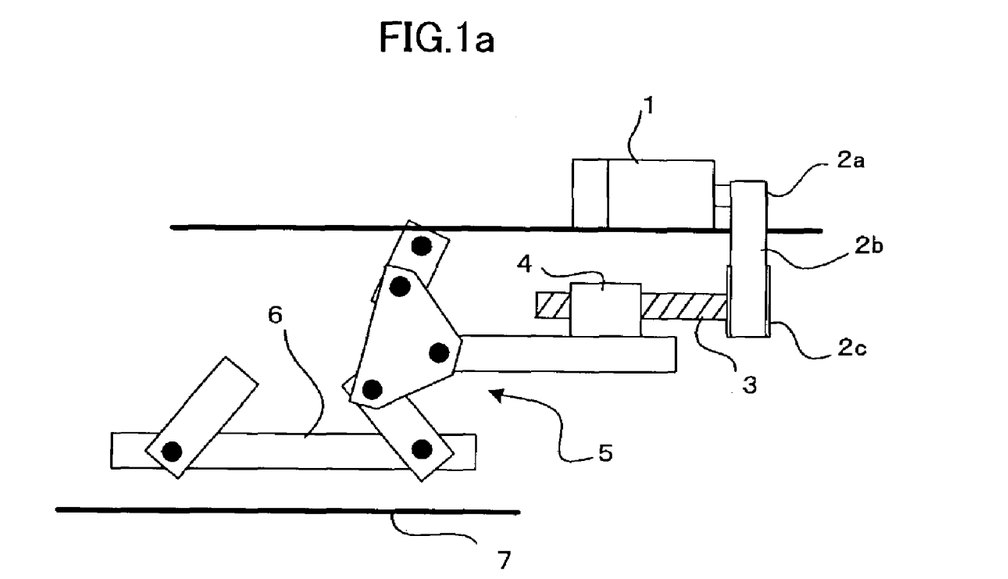
FIG. 1a is a schematic diagram of an electric press machine to which the motor control system of the present invention is applied in a state where an upper mold thereof is moved to a top dead point of a motion stroke.
Figure 1B:
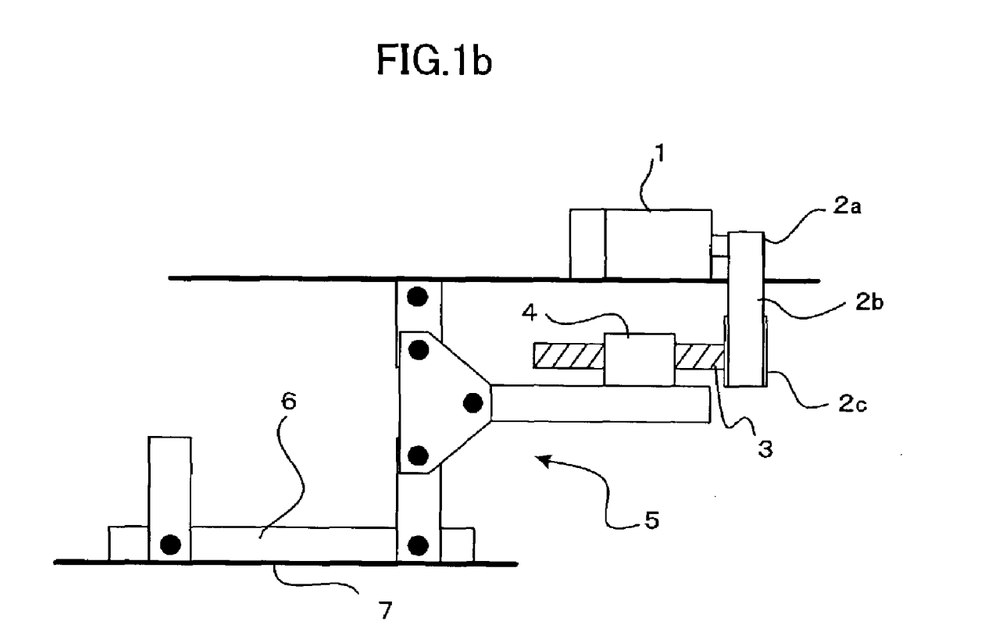
FIG. 1b is a schematic diagram of the electric press machine in a state where the upper mold is moved to a bottom dead point of the motion stroke.

FIGS. 1a and 1b schematically show operational states of an electric press machine as an example of an industrial machine in which a transmission mechanism for mechanically connecting a servomotor and a driven member includes a nonlinear element such that a stability of a control system of the machine varies in dependence on a position of the driven member.

As shown in FIGS. 1a and 1b, a transmission mechanism from a servomotor 1 to an upper mold 6 for press working includes a linkage mechanism 5 as a nonlinear transmission element. In particular, a rotational motion of an output shaft of the servomotor 1 is transmitted to a ball screw 3 through pulleys 2a, 2c and a timing belt 2b so that the ball screw 3 is rotationally driven. A ball nut 4 engaged with the ball screw 3 is fixed to one end of the linkage mechanism 5. The upper mold 6 is mounted at the other end of the linkage mechanism 5 such that the upper mold 6 is moved upward away from/downward towards a plate material 7 placed on a lower mold (not shown) to perform the press working.

FIG. 1a shows a state where the upper mold 6 is moved to a top dead point of a motion stroke of the linkage mechanism 5 and FIG. 1b shows a state where the upper mold 6 is moved to a bottom dead point of the motion stroke.

Figure 2:
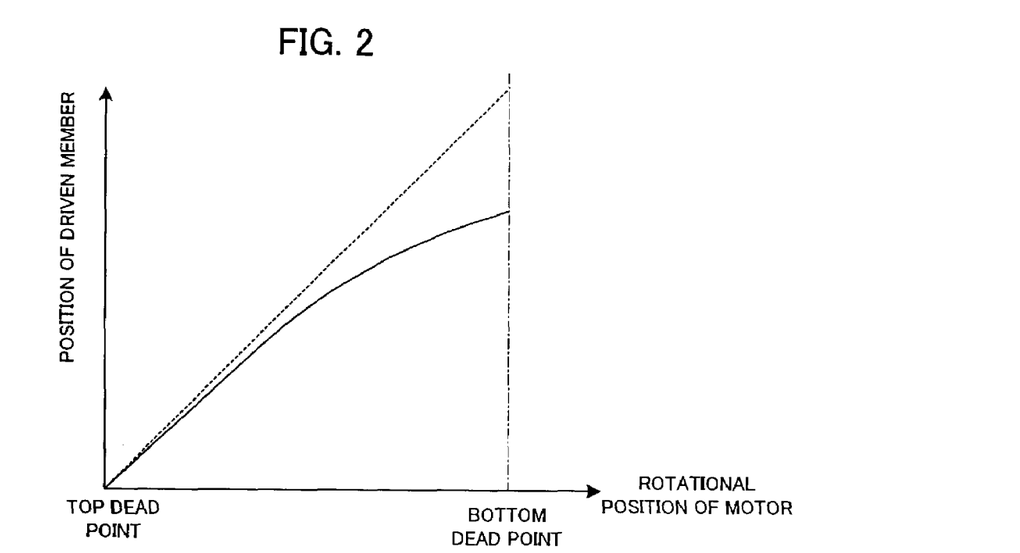
FIG. 2 is a graph showing relation between a rotational position of a motor and a position of a driven member of the electric press machine as shown in FIGS. 1a and 1b.

In the above electric press machine, relation between the rotational position of the motor 1 and the position of the driven member, i.e. the upper mold 6 is shown in FIG. 2. In FIG. 2, the position of the driven member at the top dead point and the corresponding rotational position of the motor are set to "0" on an axis of ordinate and an axis of abscissa, respectively, with directions from the top dead point to the bottom dead point set as positive directions.

If the rotational position of the motor is proportional to the position of the driven member, the relation between the rotational position of the motor and the position of the driven member should be represented by a straight line as shown by the dotted line in FIG. 2. However, since the linkage mechanism 5 as a nonlinear transmission element is intervened between the motor and the driven member, the relation between the rotational position of the motor and the position of the driven member is nonlinear as represented by the continuous line in FIG. 2. This relation is determined in dependence on characteristics of the transmission mechanism from the motor to the driven member.

As clearly seen from FIG. 2, a rate of change of the position of the driven member with respect to change of the rotational position of the motor varies in dependence on the rotational position of the motor such that the rate of change decreases as the rotational position of the motor moves closer to the bottom dead point. Accordingly, the stability of the control system in the vicinity of the top dead point differs from that in the vicinity of the bottom dead point. Since a mechanical inertia of the transmission mechanism driven by the motor in the vicinity of top dead point is larger than that in the vicinity of the bottom dead point, an electric current of the motor 1 is increased to obtain a constant acceleration in the vicinity of top dead point. Further, since the rotational position of the motor may be fluctuated by a vibration of the upper mold 2 or the transmission mechanism in the vicinity of the top dead point, the control system tends to be influenced by disturbances.

Conventionally, the operation constants for the position control processing and the velocity control processing have been predetermined to be fixed values so that a sufficient stability of the control system is obtained in the vicinity of the top dead point. Since the position control processing and the velocity control processing are performed using thus determined operation constants during the control even in the vicinity of the bottom dead point where rapidness of positional response and the positioning precision of the driven member are required, the rapidness of response of the control system and precision and efficiency of the press working are lowered.

According to the present invention, the operation constants, such as a position gain in the position control processing and a proportional gain and an integral gain in the velocity control processing are varied in accordance with the position of the driven member during the control. With this arrangement, it is not necessary to set the whole control system in accordance with the control characteristic at the position of low controllability, so that rapid response and high stability are obtained even in a machine in which the control characteristic varies in accordance with the position of the driven member.

Figure 3:
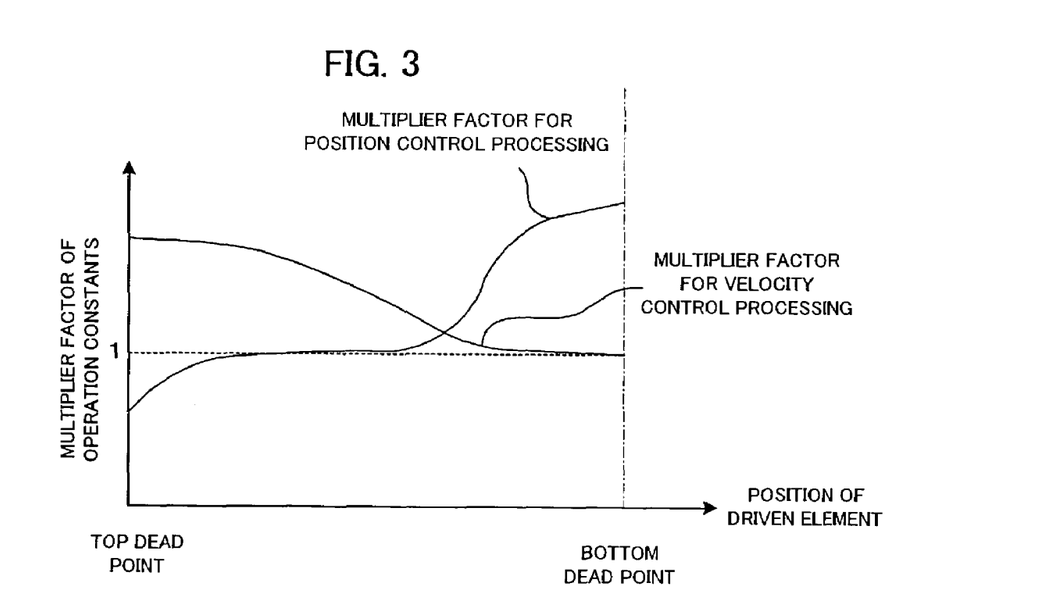
FIG. 3 is a graph showing relation between multiplier factors of operation constants for position and velocity control processing and a position of the driven member in a case where the present invention is applied to the electric press machine as shown in FIGS. 1a and 1b.

For the above example of the electric press machine, values of the operation constants are determined to secure sufficient stability in the vicinity of the top dead point and quick response and high positioning precision in the vicinity of the bottom dead point. Optimum values of multiplier factors, by which reference operation constants are respectively multiplied, in accordance with the position of the upper mold 6 are determined as shown in FIG. 3 based on analysis of the characteristic of the transmission mechanism. In FIG. 3, characteristic curves of the respective multiplier factors for the position control processing and the velocity control processing are shown with an axis of ordinate representing values of the respective multiplier factors and an axis of abscissa representing a position of the driven member. In the vicinity of the bottom dead point where a high precision of positioning is required, the multiplier factor of the operation constants for the position control processing is set to be relatively large. In the vicinity of the top dead point where stability of the control system is required, the multiplier factor for the position feedback control is set to be relatively small and the multiplier factor for the velocity control processing is set to be relatively large.

The values of the reference operation constants are stored, and also the above characteristic curves of the multiplier factors with respect to the position of the driven member are stored in the form of tables or registered in the form of equations, so that optimum values of the operation constants are calculated by multiplying the reference operation constants by the multiplier factors to vary the operation constants in accordance with the present position of the driven member in the control of the machine.

Figure 4:
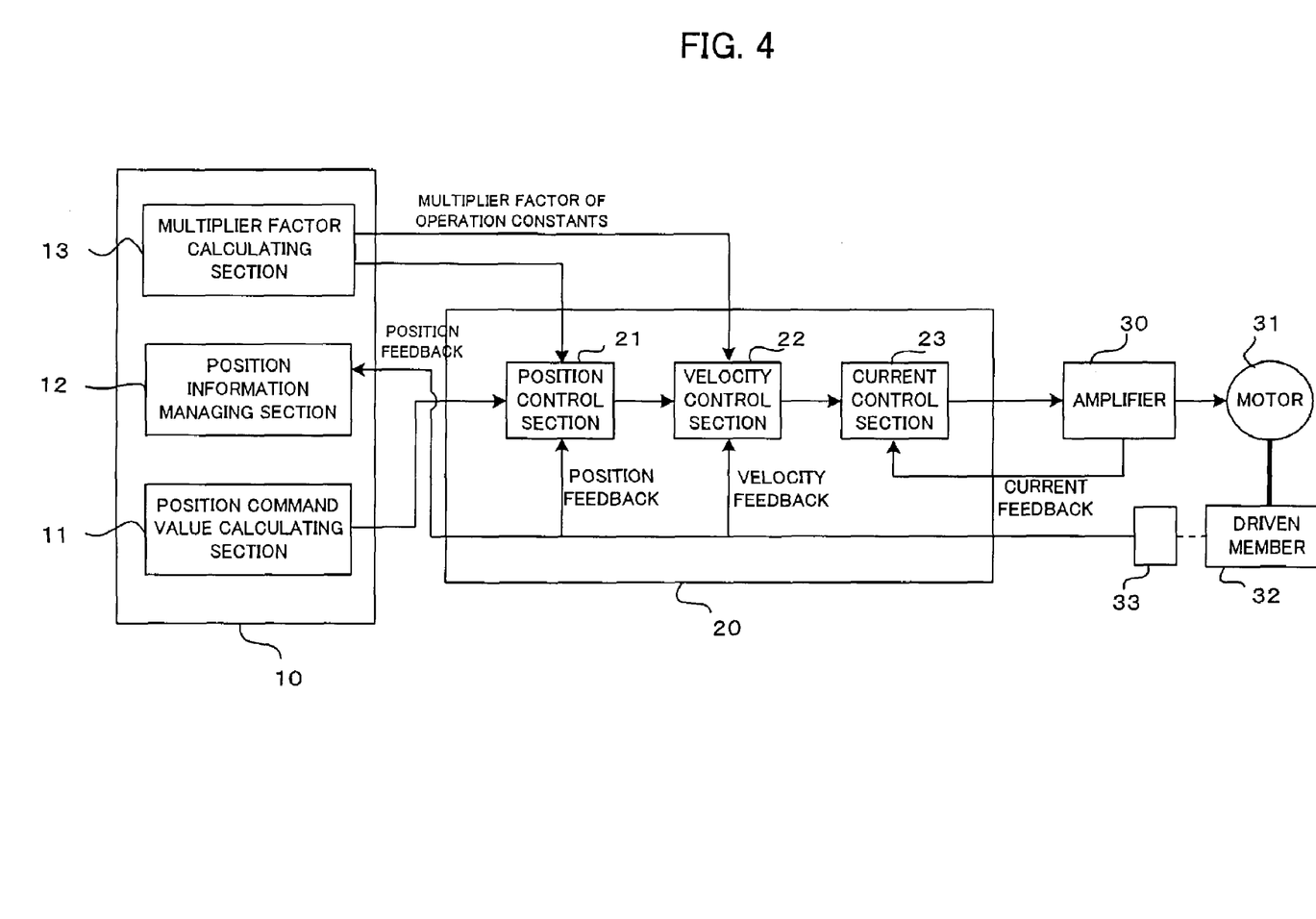
FIG. 4 is a block diagram of a motor control system according to an embodiment of the present invention.

FIG. 4 is a functional diagram of a motor control system according an embodiment of the present invention.

The motor control system comprises a host controller 10 and a servo controller 20 which are constituted by respective processors. An output of the servo controller 20 is fed to a servo amplifier 30 to drivingly control the servomotor 31. The servomotor 31 is operatively connected to a driven member 32 thorough a transmission mechanism including a nonlinear element such as the linkage mechanism 5 as shown in FIGS. 1a and 1b, so that the position and velocity of the driven member 32 is controlled. A position/velocity detector 33 is provided for detecting the position and velocity of the driven member 32 and a position feedback signal and a velocity feedback signal are fed to the servo controller 20, and the position feedback signal is also fed to the host controller 10.

The host controller 10 comprises a position command value calculating section 11 for calculating a position command to command a motion of the driven member 32 based on a program, a position information managing section 12 for managing a present position of the driven member 32 and a multiplier factor calculating section 13. The position information managing section 12 has a present position register for storing the present position of the driven member 32. The present position of the driven member 32 is obtained based on the position feedback signal from the position/velocity detector 33 and/or based on the position command issued from the position command operating section 11. The multiplier factor calculating section 13 stores data of characteristic curves of the multiplier factors of the operation constants with respect to the position of the driven member as shown in FIG. 3 in the form of the data tables or the mathematical equations.

The servo controller 20 comprises a position control section 21 to which the position command is inputted from the host controller 10 at every predetermined period, a velocity control section 22 and a current control section 23. The multiplier factors of the operation constants for the position control section 21 and the velocity control section 22 are received from the host controller 10 at every predetermined period. The position control section 21 and the velocity control section 22 receive the position feedback signal and the velocity feedback signal, respectively, from the position/velocity detector 33, and the current control section 23 receives a current feedback signal form a current detector (not shown) provided in the servo amplifier 30.

The above configuration of the motor control system can be constituted by utilizing the conventional control system for a machine tool or a robot controller by providing the multiplier factor calculating section 13 in the host controller 10 so that the multiplier factors for operation constants obtained by the multiplier factor calculating section 13 are sent to the servo controller 20.

The processing to be performed by the processor of the host controller 10 and the processing to be performed by the processor of the servo controller 20 will be described referring to flowcharts of FIGS. 5 and 6, respectively.

Immediately after a power supply to the motor control system is turned on, the operation constants (the position gain of the position control processing, the proportional gain and the integral gain of the velocity control processing) for the servo controller 20 are set to the upper limit values until an initial position of the driven member 32 is established to facilitate the establishment of the initial position of the driven member 32. After the position of the driven member 32 is established, the operation constants are set to the predetermined reference values.

Figure 5:
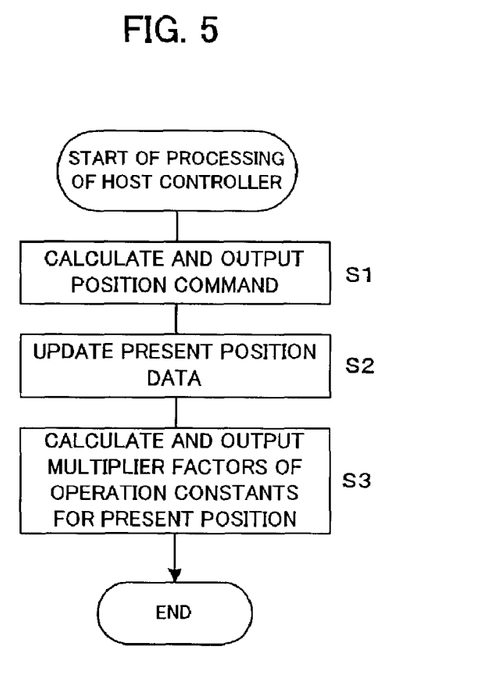
FIG. 5 is a flowchart of processing to be performed by a host controller of the motor control system.

As shown in FIG. 5, the processor of the host controller 10 calculates a position command for moving the driven member based on an operation program and outputs the position command to the servo control section 20 at every predetermined period (Step S1; processing to be performed by the position command calculating section 11 in FIG. 4). Then, the present position of the driven member 32 is stored in the present position register by adding the value of the position command outputted to the servo controller 20 to the value of the present position register to be accumulated. Alternatively, the present position of the driven member 32 may be obtained by summing values of the position feedback signal from the position/velocity detector 33 in the present position register (Step S2: processing to be performed by the present position information managing section 12 in FIG. 4).

If the adjustment of the operation constants is not commanded to be performed, the procedure is terminated at the above processing at Step S2. If the adjustment of the operation constants is commanded to be performed by an external input by a manual operation on an operation panel, or a command designated in a machining program, or a command issued as a result of processing in the motor control system with predetermined conditions fulfilled, the procedure proceeds further to Step S3. In Step S3, respective multiplier factors of the operation constants for the position control section 21 and the velocity control section 22 for the present position of the driven member 32 are obtained using the data tables or the equations. The obtained values of the multiplier factors of the operation constants are outputted to the servo controller 20 at every predetermined period. The processing at this step is performed by the multiplier factor calculating section 13 in the functional block diagram of FIG. 4.

Figure 6:
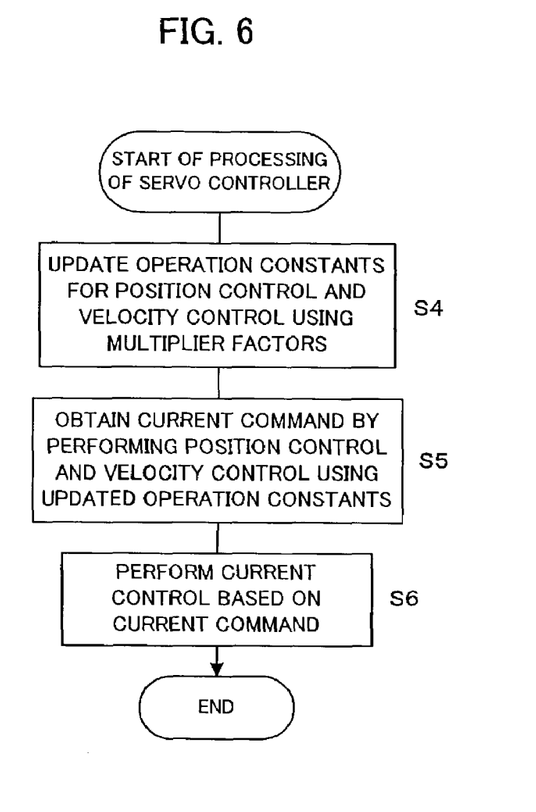
FIG. 6 is a flowchart of processing to be performed by a servo controller of the motor control system.

The processor of the servo controller 20 executes the processing as shown in FIG. 6 at every predetermined processing period. First, the values of the multiplier factors of the operation constants for the position control section 21 and the velocity control section 22 received from the host controller 10 are respectively multiplied by the reference operation constants (the position gain for the position control processing and the proportional gain and the integral gain in the velocity control processing) which are predetermined for the position control section 21 and the velocity control section 22, to obtain and update the values of the operation constants for the present processing period (Step S4). In the case where the command to perform the varying of the operation constants has not been issued, since the multiplier factor of the mathematical operation constants are not outputted to the servo controller 20, the reference operation constants are used.

The position control section 21 obtains a position deviation based on the position command issued from the position command calculating section 11 of the host controller 10 and the position feedback signal from the position/velocity detector 33, and multiplies the position deviation by the updated position gain to obtain a velocity command. The velocity control section 22 obtains a velocity deviation based on the velocity command from the position control section 21 and the velocity feedback signal from the position/velocity detector 33, and performs the velocity control processing using the velocity deviation and the updated operation constants (the proportional gain and the integral gain) to obtain a torque command (current command). For example, in the case where the velocity control section 23 is designed to perform the proportional plus integral (IP) control, a value obtained by multiplying the velocity deviation by the updated proportional gain, and a value obtained by multiplying integrated value of the velocity deviation by the updated integral gain are added together, to obtain the torque command (current command).

In Step S6, the current control section 23 performs the current control processing based on the torque command (current command) from the velocity control section 22 and the current feedback value from the current detector, to control the servomotor 31 through the amplifier 30, so that the position and velocity of the driven member 32 are controlled.

The foregoing embodiment adopts a full-closed loop control system in which the feedback controls are performed based on the feedback signals of the position and velocity of the driven member 32 detected by the position/velocity detector 33 for detecting the position and velocity of the driven member 32. The present invention is applicable to a semi-closed loop control system in which the feedback controls are performed based on feedback signals from a position/velocity detector for detecting the position and velocity of the servomotor 31.

In this case, appropriate values of the multiplier factors of the operation constants with respect to the position of servomotor 31 are determined and stored in the host controller 10 in place of the values of the multiplier factors of the operation constants with respect to the position of the driven member 32. As shown in FIG. 2, the relation between the rotational position of the motor and the position of the driven member is nonlinear. However, since the motor is mechanically connected to the driven element through the transmission mechanism and thus the rotational position of the motor corresponds to the position of the driven member in one-to-one relation, appropriate values of the multiplier factors of the operation constants with respect to the rotational position of the motor can be obtained based on the relation between the rotational position of the motor and the position of the driven member and the appropriate values of the multiplier factors with respect to the position of the driven member. The appropriate values of the multiplier factors for the present rotational position of the motor are determined using the stored data of the multiplier factors with respect to the position of the motor.

Further, it is possible to feed back the position of the driven member detected by a position detector and feed back the velocity of the motor detected by a velocity detector, or feedback the velocity of the driven member detected by a velocity detector and feedback the position of the motor detected by a position detector. In the case of feeding back the position of the driven member, the data of the multiplier factor of the operation constants with respect to the position of the driven member as shown in FIG. 3 is used for the position control processing, and in the case of detecting the position of the motor to be fed back, the data of the multiplier factor of the operation constants with respect to the rotational position of the motor is used for the velocity control processing.

Further in the foregoing embodiment, both of the operation constants for the position control processing by the position control section 21 and for the velocity control processing by the velocity control section 22 are varied in the control processing. The operation constants for only one of the position control processing and the velocity control processing may be varied in accordance with the position of the driven member or the rotational position of the motor in dependence on kind, characteristic and usage of the machine of the servomotor to be controlled by the motor control system.

Furthermore, the multiplier factor calculating section 13 is provided in the host controller in the foregoing embodiment, but the multiplier factor calculating section may be provided in the servo controller 20. In this case, data of the position of the driven member or the rotational position of the servomotor may be transferred to the servo controller 20 from the host controller 10 at every predetermined period, or the servo controller 20 may have a register for storing the position of the driven member or the rotational position of the motor based on the position command issued from the host controller 10 or the position feedback signal so as to determine the multiplier factors of the operation constants based on the stored position data to update the operation constants for the position, velocity and current control sections.

Furthermore, the data table or mathematical equation for obtaining the multiplier factors of the operation constants are stored in the foregoing embodiment, but the data table or mathematical equation representing relation between values of the operation constants and the position of the driven member or the rotational position of the servomotor may be stored without using the multiplier factors and the reference operation constants.

In a case where values of the multiplier factors of the operation constants or values of the operation constants outputted from the host controller 10 at every predetermined period greatly vary, i.e. the values of the multiplier factors or the operation constants calculated at the last processing period are greatly different from that obtained in the present processing period, the control using the updated values of the operation constants would be unstable and thus not desirable. To cope with such case, values of the multiplier factors of the operation constants (or values of the operation constants) may be adjusted so as to vary smoothly.

For instance, n-number (n: an integer not smaller than 2) of registers R1, R2, ..., Rn for storing the values of the multiplier factors obtained based on the data table or the mathematical equations, and operating means for summing outputs of all the registers and dividing the sum by "n" are provided in the multiplier factor calculating section 13 of the host controller 10, so that output of the operating means is used as the value of the multiplier factors at the present processing period (processing at Step S3 in FIG. 5).

The reference values of the multiplier factors are stored as initial values of the registers R1, R2, ..., Rn, and when the command for varying the operation constants, the values of the registers are shifted such that the value stored in the register Rn−1 is stored in the register Rn, the value stored in the register Rn−2 is stored in the register Rn−1, ..., the value stored in the register R1 is stored in the register R2, and the value of the multiplier factors (or the operation constants) is stored in the register R1. The values stored in the registers R1, R2, ..., Rn are summed up and the sum is divided by the number "n", and the resultant quotient is outputted as the value of the multiplier factors (or the operation constants) for the present processing period.

When all of the registers stored the reference values, the output becomes equal to the reference value, and when a value of the calculated multiplier factor different from the reference value is inputted into the shift register, the output of the operation means reaches the value after "n" processing periods. For instance, in a case where a value B of the multiplier factor obtained based on the data table or the mathematical equation is inputted into the shift register in which the reference values A are stored for "n" processing periods, values of $\{(n-1)A+B\}/n$ is outputted at the first processing period, $\{(n-2)A+2B\}$ is outputted at the second processing period, ..., $nB/n=B$ is outputted at n-th processing period, so that the output as the value of the multiplier factor of the operation constants varies smoothly to reach the value B.

According to the present invention, stability and rapidness of the motor control are secured even in a case where the control characteristic of the driving system changes in accordance with the position of the driven member or the rotational position of the servomotor, e.g. in a driving system including a nonlinear transmission element such as a link mechanism.

What is claimed is:

1. A motor control system for controlling a servomotor for driving a driven member through a transmission mechanism for mechanically connecting the servomotor and the driven member, comprising:
 a servo controller having a position control section for performing position control processing for feedback controlling a position of the driven member, and a velocity control section for performing velocity control processing for feedback controlling a velocity of the driven member;
 a host controller for issuing a position command commanding a position of the driven member to said servo controller, and outputting information on operation constants for the position control processing by the position control section and/or the velocity control processing by the velocity control section, to be corresponding to the commanded position; and
 operation constant varying unit for varying operation constants for the position control processing and/or the velocity control processing in accordance with the information on the operation constants outputted from said host controller,
 wherein the driven member comprises a mold of an electric press machine for performing a press work, and the operation constants have different values in the vicinity of a bottom dead point where the press work is performed and in the vicinity of a top dead point where the press work is not performed.

2. A motor control system according to claim 1, wherein the operation constant for the position control processing is a position gain for obtaining a velocity command from a deviation between the position command issued from said host controller and a position of the driven member detected by a position detector, the servo motor is mechanically connected with the driven member through the transmission mechanism such that a rate of change of the position of the driven member with respect to change of a position of the servomotor is not constant, and said operation constant varying unit varies the position gain in accordance with the commanded position of the driven member.

3. A motor control system according to claim 1, wherein said operation constant varying unit comprises a storage unit for storing data representing relation between the position of the driven member and the operation constants, and determines values of the operation constants for the present position of the driven member using the stored data.

4. A motor control system according to claim 3, wherein said storage unit is provided in said host controller.

5. A motor control system according to claim 1, said operation constant varying unit comprises a storage unit for storing a mathematical equation representing a relation between the position of the driven member and the operation constants, and determines values of the operation constants for the present position of the driven member using the mathematical equation.

6. A motor control system according to claim 5, wherein said storage unit is provided in said host controller.

7. A motor control system according to claim 1, wherein said operation constant varying unit starts varying of the operation constants upon receipt of a signal from an external device or a signal produced by internal processing in the motor control system.

8. A motor control system according to claim 7, wherein the determination of values of the operation constants is performed by said host controller.

9. A motor control system according to claim 1, wherein said operation constant varying unit starts varying of the operation constants upon receipt of a program command.

10. A motor control system according to claim 9, wherein the determination of values of the operation constants is performed by said host controller.

11. A motor control system according to claim 1, wherein said operation constant varying unit determines values of the operation constants to be varied smoothly.

12. A motor control system according to claim 11, wherein the varying of the operation constant is performed by said host controller.

13. A motor control system according to claim 1, wherein the operation constants for the position control section and/or the velocity control section are set to upper limit values until an initial position of the driven member is established after a power supply to the motor control system is turned on.

14. A motor control system according to claim 1, wherein said operation constant varying unit varies the operation constants in accordance with a present rotational position of the servomotor mechanically connected with the driven member by the transmission mechanism.

15. A motor control system according to claim 14, wherein said operation constant varying unit stores a data table representing relation between the rotational position of the servomotor and the operation constant, and determines values of the operation constants for the present rotational position of the servomotor using the data table.

16. A motor control system according to claim 15, wherein said data table is provided in said host controller.

17. A motor control system according to claim 14, said operation constant varying unit stores a mathematical equation representing a relation between the rotational position of the servomotor and values of the operation constants, and determines values of the operation constants for the present rotational position of the servomotor using the mathematical equation.

18. A motor control system according to claim 17, wherein the determination of values of the operation constants for the present rotational position of the servomotor is performed by said host controller.

19. A motor control system controlling a servomotor driving a driven member through a nonlinear transmission mechanism mechanically connecting the servomotor and the driven member, comprising:
 a position controller generating position control commands according to a position input command, reference position operation constants and feedback of a present position of the driven member, the position control commands controlling a position of the driven member;
 a velocity controller generating velocity control commands according to an input velocity command, reference velocity operation constants and feedback of a present velocity of the driven member, the velocity control commands controlling a velocity of the servomotor to control a velocity of the driven member; and
 a constant multiplier calculator adjusting the reference position operation constants and/or the reference velocity operation constants according to the present position of the driven member, wherein the position and velocity of the driven member is controlled through the nonlinear transmission according to the present position of the driven member.

20. The system of claim 19, wherein the reference position operation constant comprises a position gain, and the reference velocity operation constants comprise at least one of a proportional gain and an integral gain.

21. The system of claim 19, wherein the reference position operation constants and the reference velocity operation constants are stored as data values according to a position of the driven member.

22. The system of claim 19, wherein the constant multiplier calculator adjusts the reference position operation constants by a small amount and adjusts the reference velocity operation constants by a large amount when the present position of the driven member is near a top dead point.

23. The system of claim 19, wherein the motor control system is a full-closed loop control system.

* * * * *

UNITED STATES PATENT AND TRADEMARK OFFICE
CERTIFICATE OF CORRECTION

PATENT NO. : 7,248,014 B2  Page 1 of 1
APPLICATION NO. : 10/461331
DATED : July 24, 2007
INVENTOR(S) : Eiji Genma et al.

It is certified that error appears in the above-identified patent and that said Letters Patent is hereby corrected as shown below:

On The Title Page Item (56)
Page 2, (Foreign Patent Documents) Line 4, below "7-261773" delete "JP 8-161004 6/1996" (Repeated entry).

Column 5, Line 65, change "S1;" to --S1:--.

Column 9, Line 39, change "servo motor" to --servomotor--.

Signed and Sealed this

Twentieth Day of November, 2007

JON W. DUDAS
*Director of the United States Patent and Trademark Office*